United States Patent
Krieger et al.

(10) Patent No.: US 8,869,153 B2
(45) Date of Patent: Oct. 21, 2014

(54) QUALITY OF SERVICE SCHEDULING FOR SIMULTANEOUS MULTI-THREADED PROCESSORS

(75) Inventors: Orran Y. Krieger, Newton, MA (US); Bryan S. Rosenburg, Cortlandt Manor, NY (US); Robert B. Tremaine, Stormville, NY (US); Robert W. Wisniewski, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1493 days.

(21) Appl. No.: 12/130,612

(22) Filed: May 30, 2008

(65) Prior Publication Data
US 2008/0229321 A1    Sep. 18, 2008

Related U.S. Application Data

(63) Continuation of application No. 11/488,977, filed on Jul. 19, 2006.

(51) Int. Cl.
*G06F 9/46* (2006.01)
*G06F 9/38* (2006.01)
*G06F 9/50* (2006.01)

(52) U.S. Cl.
CPC .............. *G06F 9/505* (2013.01); *G06F 9/3851* (2013.01)
USPC ........................................................ 718/102

(58) Field of Classification Search
CPC .................................................. G06F 9/5044
See application file for complete search history.

(56) References Cited

U.S. PATENT DOCUMENTS

| 5,838,968 | A | 11/1998 | Culbert |
| 6,212,544 | B1 | 4/2001 | Borkenhagen et al. |
| 6,535,905 | B1 | 3/2003 | Kalafatis et al. |
| 6,549,930 | B1 | 4/2003 | Chrysos et al. |
| 7,596,788 | B1 * | 9/2009 | Shpigelman .................. 718/100 |
| 2001/0056456 | A1 * | 12/2001 | Cota-Robles ................. 709/103 |
| 2003/0125900 | A1 * | 7/2003 | Orenstien et al. ............. 702/132 |
| 2003/0135617 | A1 * | 7/2003 | Larkin ......................... 709/225 |
| 2005/0262255 | A1 * | 11/2005 | Goossen et al. .............. 709/231 |
| 2006/0179196 | A1 | 8/2006 | Gray |
| 2007/0150657 | A1 * | 6/2007 | Yigzaw et al. ................ 711/128 |
| 2007/0150900 | A1 | 6/2007 | Hankins et al. |

OTHER PUBLICATIONS

U.S. Office Action issued Aug. 4, 2010, in related U.S. Appl. No. 11/488,977.
U.S. Office Action issued Dec. 30, 2010, in related U.S. Appl. No. 11/488,977.

* cited by examiner

*Primary Examiner* — Mengyao Zhe
(74) *Attorney, Agent, or Firm* — Scully, Scott, Murphy & Presser, P.C.; Daniel P. Morris, Esq.

(57) ABSTRACT

A method and system for providing quality of service guarantees for simultaneous multithreaded processors are disclosed. Hardware and operating system communicate with one another providing information relating to thread attributes for threads executing on processing elements. The operating system controls scheduling of the threads based at least partly on the information communicated and provides quality of service guarantees.

19 Claims, 4 Drawing Sheets

FIG. 2

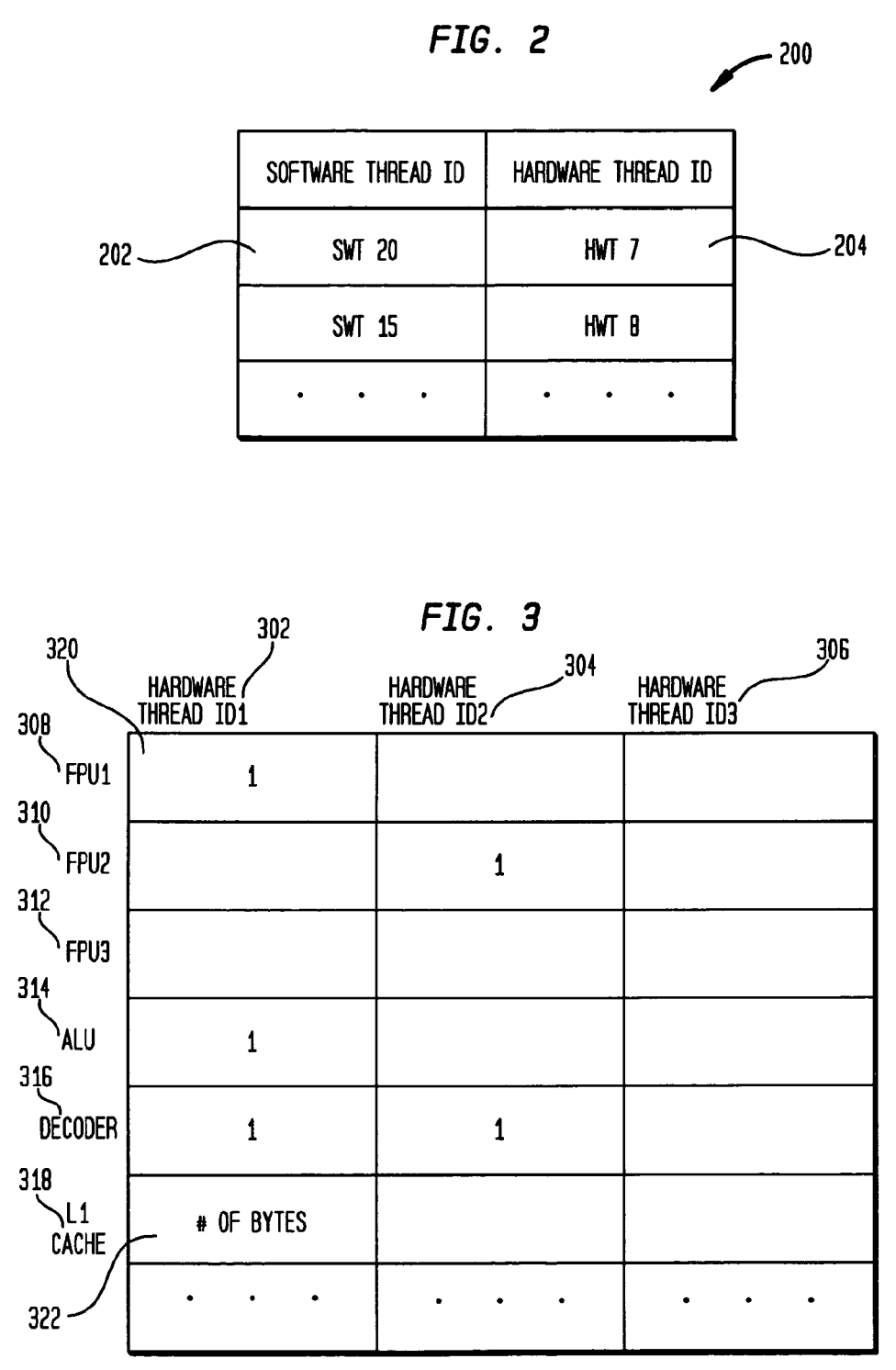

| SOFTWARE THREAD ID | HARDWARE THREAD ID |
|---|---|
| SWT 20 | HWT 7 |
| SWT 15 | HWT 8 |
| . . . | . . . |

FIG. 3

| | HARDWARE THREAD ID1 | HARDWARE THREAD ID2 | HARDWARE THREAD ID3 |
|---|---|---|---|
| FPU1 | 1 | | |
| FPU2 | | 1 | |
| FPU3 | | | |
| ALU | 1 | | |
| DECODER | 1 | 1 | |
| L1 CACHE | # OF BYTES | | |
| . . . | . . . | . . . | . . . |

QUALITY OF SERVICE SCHEDULING FOR SIMULTANEOUS MULTI-THREADED PROCESSORS

RELATED APPLICATION

This application is a continuation of U.S. Ser. No. 11/488,977, filed Jul. 19, 2006, the entire contents of which are incorporated herein by reference.

STATEMENT REGARDING FEDERALLY SPONSORED RESEARCH OR DEVELOPMENT

This invention was made with Government support under Contract No.:NBCH020056 (DARPA) awarded by Defense, Advanced Research Projects Agency. The Government has certain rights in this invention.

FIELD OF THE INVENTION

The present disclosure generally relates to computer processing and particularly to multithreaded processing.

BACKGROUND OF THE INVENTION

As the number of available transistors has increased, processor-chip architects have turned to multithreaded processors such as simultaneous multithreaded (SMT) processors as a way to continue to increase performance. Generally, SMT processors permit multiple threads to execute instructions using the same set of functional units within a given core. However, this means that the different hardware threads then compete for use of those functional units. One class of shared resources includes the execution units or functional units such as the integer units, floating-point units, load-store units, and the like. It is predicted that SMT processor will become a commonplace platform for the next generation of processor chips. However, because of its capability to allow sharing of processor resources, SMT technique in processors introduces a new degree of complexity in scheduling.

Real-time concerns have long been researched and implemented in operating systems. However, with the advent of multimedia applications such as mpeg players, Quality of Service (QOS) concerns have been addressed more seriously by a much wider range of operating systems. Now, most operating systems provide some notion of QOS to the applications.

However, when it comes to multithreaded processing, the current operating systems' quality of service schedulers cannot adequately handle threads executing on an SMT processor. This is because the threads interfere with each other, for example, by more than one thread trying to use greater than ½ of the available floating point units, or by colliding in their use of the L1 cache. Because this happens dynamically, it is difficult to predict the performance degradation the interference causes, and thus precludes the ability to make quality of service guarantees. In addition, conventional SMT processor hardware does not provide the operating system with a capability to understand the crucial attributes of a thread on the SMT processor.

Without significantly under utilizing an SMT processor, the operating system cannot provide QOS guarantees. Without knowledge of the characteristics of the threads running on an SMT processor, an operating system would not be able to provide QOS guarantees if it schedules more than one thread on a given SMT core. There is no mechanism currently available for providing information about the functional unit utilization per thread. What is needed is a method and system for the hardware and the operating system on multithreaded processors such as SMT processors to communicate information about the threads on the processors, so that for example, an operating system may provide QOS guarantees.

BRIEF SUMMARY OF THE INVENTION

A method and system for providing quality of service scheduling in multithreaded processing are disclosed. The method in one aspect includes identifying one or more hardware resources utilized by a thread in simultaneous multithreaded processing, and communicating the identified one or more hardware resource used by the thread. The resource usage may be recorded for an individual thread or a set of threads. Thus, in another aspect, the step of identifying may include identifying one or more hardware resources utilized by a set of threads in simultaneous multithreaded processing. In one aspect, hardware identifies the thread's use of resources.

The step of communicating may include storing information pertaining to the identified one or more hardware resource utilization. Hardware, for instance, may store the information in a register accessible by an operating system. The one or more hardware resources for example may include but are not limited to one or more processing elements, functional units, or cache memory, or combination thereof. Examples of processing elements and functional units may include but are not limited to a floating point unit, an integer unit, an arithmetic logic unit, a shifter, a register, a load-store unit, or combination thereof. Examples of cache memory may include but are not limited to cache line and cache sub-levels.

The method in another aspect may include scheduling one or more threads based on information associated with the identified one or more hardware resource utilization. In one aspect, the software or operating system performs the scheduling. The method in yet another aspect may include reserving one or more hardware resources for a thread based on information associated with the identified one or more hardware resource utilization. The step of reserving may be performed by the software or operating system. In one aspect, the step of reserving may include storing one or more data bits in a register accessible by hardware, the data bits identifying which one or more hardware resources to reserve for a thread. In another aspect, the method may further include analyzing information associated with the identified one or more hardware resource utilization by a thread. Still yet in another aspect, the method may include restricting one or more hardware resources from a thread based on information associated with the identified one or more hardware resource utilization.

A system for providing quality of service scheduling in multithreaded processing in one aspect may include a hardware controller on a processor operable to track a thread's use of one or more hardware resources in simultaneous multithreaded processing. The hardware controller may be further operable to communicate information associated with the use of one or more hardware resources per thread. Software or an operating system is operable to access the information and schedule one or more threads based on the information. In one aspect, the communication between the software and the hardware about information associated with one or more threads may be performed using software thread identifier to hardware thread identifier mapping.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 2 shows an example of a register storing software to hardware thread mapping.

FIG. 3 illustrates an example of a utilization table that is populated as the hardware executes a thread.

DETAILED DESCRIPTION

In an exemplary embodiment of the present disclosure, the hardware provides information as to which hardware threads executing on a core are using or have used which processing elements or functional units or the like on the core. The hardware may also provide information pertaining to memory utilization of a hardware thread, for instance, the hardware thread's use of L1 cache on the core. Additional characteristics or attributes of the hardware threads may be provided. The operating system uses this information to predict resource availability for scheduled applications, to reserve a particular processing element for a given thread, and to otherwise guarantee quality of service to applications. In another embodiment, the information may be provided for a given set of hardware threads, and the operating system or the like may use the information to predict resource availability and reserve processing elements for a given set of hardware threads.

Figure 1:
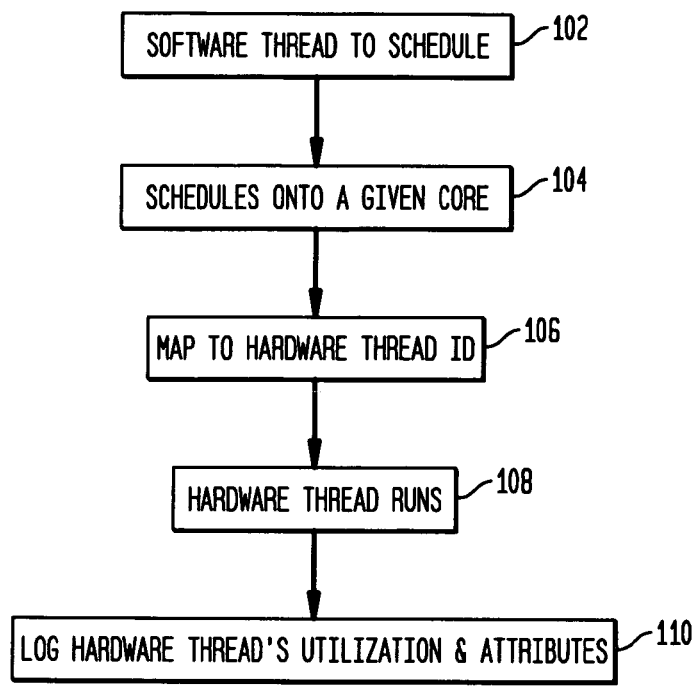
FIG. 1 is a flow diagram illustrating a method of the present disclosure in one embodiment.

FIG. 1 is a flow diagram illustrating a method of the present disclosure in one embodiment. At 102, an operating system or the like has a software thread, for example, a software application or entity, to schedule. At 104, the operating system schedules the thread onto a given core. A core on a processor for example includes a plurality of processing elements and can handle an execution of a thread. A core for example can have one or more floating point units, integer units, arithmetic logic units (ALUs), shifters, and the like. A processor may include one or more cores. In SMT processing, instructions from multiple threads of execution share the functional units of a single core.

In one embodiment, the mapping between the threads that the operating system schedules and the hardware threads that the hardware receives and executes, is kept, for example, in a series of registers associated with the hardware threads. FIG. 2 shows an example of a register table having the software to hardware thread mapping. In one embodiment, when the operating system schedules the thread, the operating system records the software thread identifier (id) 202. When the hardware takes that thread to execute, the hardware tags the thread with a hardware thread id 204 and enters the corresponding hardware thread id in the mapping table 200.

Referring to FIG. 1, the hardware enters the hardware thread id that maps to the software thread id at 106, for example, into a register table such as the one shown in FIG. 2. The operating system now has a mapping of its threads to hardware threads. Whenever the operating system needs to communicate with the hardware about its thread, the operating system can use the mapped hardware thread id. At 108, the thread runs. At 110, for example, as the thread executes, the hardware records that thread's use of various processing elements such as the floating point units, integer units, ALUs, shifters, registers, decoder, and the like. The hardware may also log the thread's memory utilization patterns such as the thread's use of L1 cache, the amount of use, etc. Other characterization or attributes of the running hardware thread may be provided similarly. In one embodiment of the present disclosure, this information may be stored or logged in a utilization table such as the one shown in FIG. 3. The steps shown in FIG. 1 are repeated for additional threads or applications or the like that the operating system has to schedule, and the utilization table for each thread is populated with respective usage or characterization information according to the method shown in FIG. 1 in an exemplary embodiment.

FIG. 3 illustrates an example of a utilization table in one embodiment, which for example is populated when the hardware executes a thread and is accessible by an operating system or the like. For a given hardware thread, for example, identified by a thread id 302, 304, 306, the hardware may record the usage information for the functional units (e.g., 308, 310, 312, 314, 316) and the cache (318) or the like on a given core or any other characterization or attributes associated with the thread. In one embodiment, the information may be simply a bit setting to show whether a hardware thread used that particular functional unit or not. For instance, a value of "1" at 320 shows that the hardware thread identified by thread id1 302 utilized floating point unit 1 (FPU1) 308. Similarly, the table shows that this thread used ALU 314 and decoder 316. Likewise, the hardware thread having hardware thread id2 used FPU2 at 310 and decoder at 316. In another embodiment, the amount of use for the particular functional unit may be recorded by keeping a counter and incrementing the counter for each cycle of use. In one embodiment, the hardware thread's cache utilization 318, for instance, L1 cache may be logged by entering the number of bytes that thread has in the cache as shown in 322. Information about additional processing elements, functional units, caches, and other resources may be stored. The table shown in FIG. 3 is for illustrative purposes only. Any other known or will-be-known method or scheme for logging or recording information or otherwise communicating information may be used. For instance, a separate memory bank or register may be used per thread for keeping track of that thread's attributes, characterization or usage of the processing elements and resources on the core.

Figure 4:
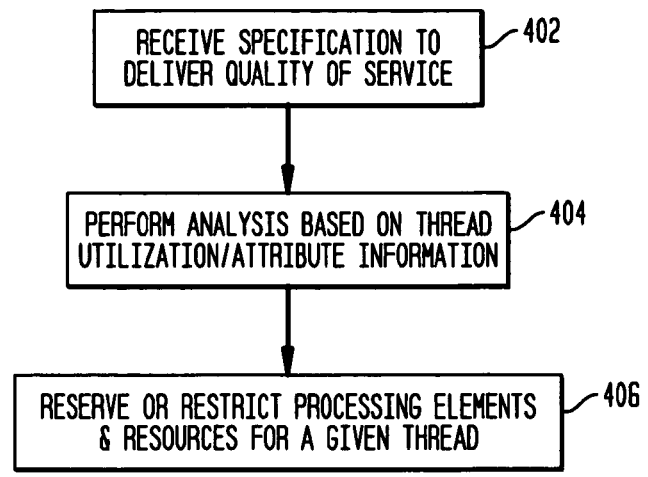
FIG. 4 is a flow diagram illustrating a method for providing quality of service guarantees in an exemplary embodiment of the present disclosure.

In an exemplary embodiment, the operating system or the like uses the logged information to determine and predict resource availability for a given thread, control to an extent what resources can be allocated to what threads, and otherwise provide reasonable quality of service guarantees to applications or the like. FIG. 4 is a flow diagram illustrating a method for providing quality of service guarantees in an exemplary embodiment of the present disclosure. At 402, an operating system receives specifications to deliver quality of service from applications, users, or from the system, or from any other entity that can request such service. A specification for example may require that the application be run and completed in a predetermined amount of time. Video or audio streaming applications for instance may require that there be no noticeable delay during the streaming process. At 404, the operating system or the like performs analysis based on the information logged about hardware thread's usage of various processing elements and resources and its characterization and attributes, for example, as recorded in a table such as the utilization table shown in FIG. 3. The analysis may determine for example, memory utilization pattern, thread affinity concern, thread interference issue, and other thread resource utilization affection behavior. Such information may be used, for instance, in scheduling and/or to reserve or restrict one or more hardware resources.

At 406, based on the analysis, the operating system communicates to the hardware to reserve certain resources for a given thread, to restrict other resources for another thread, etc. For instance, the logged information may provide that this particular type of application requires certain functional units and processing elements to execute. In turn, the operating system may decide that it needs to reserve those functional units and processing elements for one or more threads associated with that particular application in order to meet the guaranteed quality of service. The operating system in one embodiment may communicate such reservation requests for functional units, processing elements or caches to the hardware, for example, by using another register. The operating system, for example, may fill in a table such as the one shown in FIG. 5.

Figure 5:
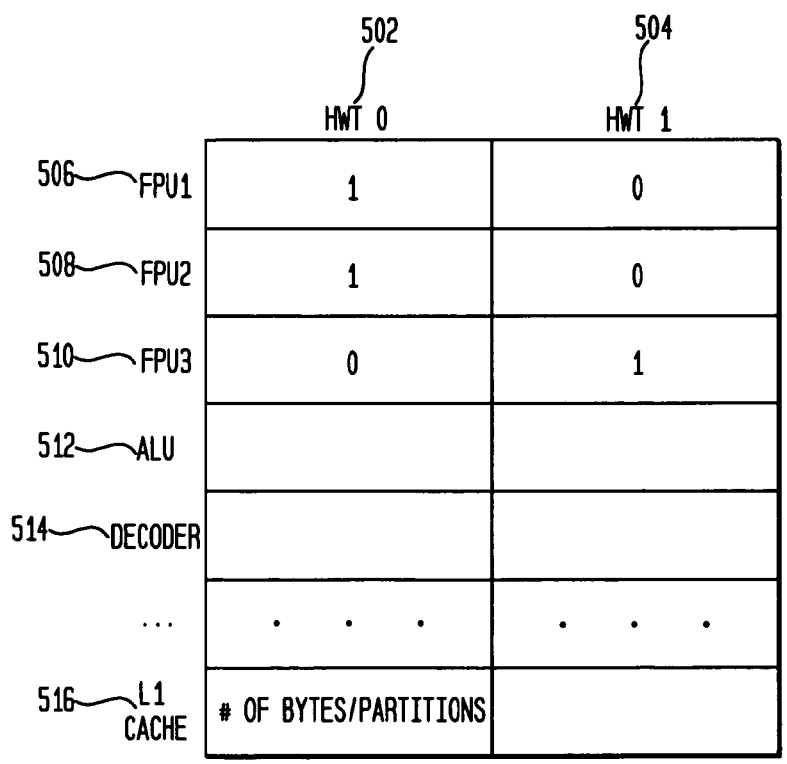
FIG. 5 illustrates a register memory storing operating system's reservation information for the resources on a core.

FIG. 5 illustrates bits in a register storing operating system's reservation information for the resources on a core. Various processing elements, function units, cache, and the like (as shown at 506, 508, 510, 512, 514, 516) may be reserved for different threads 502, 504. For example, the table shows that the operating system is reserving floating point unit 1 (FPU1) 506 and floating point unit 2 (FPU2) 508 for the hardware thread identified as HWT0 502. Similarly, for the hardware thread with thread id HWT1 504 the operating system is reserving floating point unit 3 (FPU3) 510. The reservation may be indicated as a bit value as shown in the entries. For example, a value of 1 may indicate to reserve while a value of 0 may indicate to restrict the particular resource from being used by that thread. Another value in the entry, for example, may indicate that it is left to the hardware to decide which thread may use that resource. In one embodiment, reservation for cache 516 may be indicated by the number of bytes or partitions to reserve.

Figure 6:
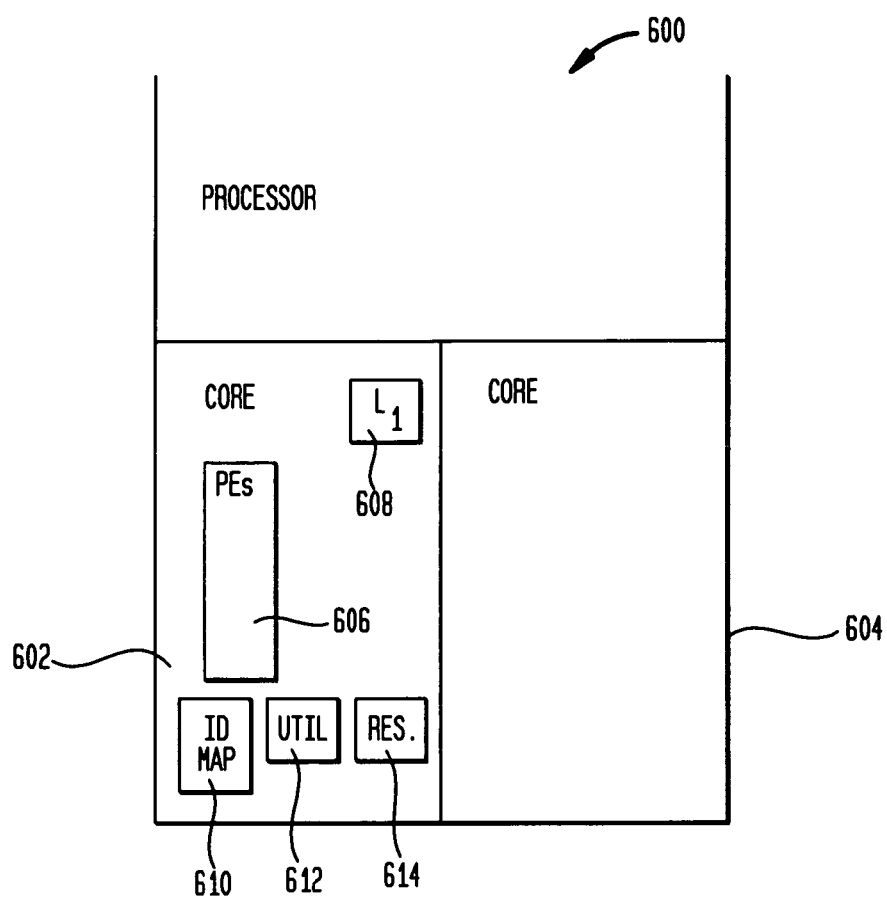
FIG. 6 is a diagram illustrating an example of processor components in one embodiment of the present disclosure.

FIG. 6 is a diagram illustrating an example of processor components in one embodiment of the present disclosure. A processor 600, for instance, may include one or more cores 602, 604. The example shown in FIG. 6 illustrates a dual-core processor. Each core 602, 604 may include a set of processing elements 606 or functional units and cache memory 608 on which the threads of SMT are multiplexed. Processing elements 606, for instance, may include one or more floating point units (FPU), integer units, arithmetic logic units (ALU), registers, decoders, shifters, load-store units, etc., enabled to process thread executions. In one embodiment of the present disclosure, the core may also include registers 610, 612, 614 for storing information associated with various characteristics of a thread as described above. The register at 610, for example, may store mappings of software threads identifiers to their corresponding hardware thread identifiers. In one embodiment, an operating system accesses this register to log its software thread ids, and the hardware inserts the corresponding hardware thread ids. Thereafter, communications regarding the threads between the operating system and the hardware may be performed using the thread id mappings.

In one embodiment, the register at 612 may store information regarding various characterization or attributes of a thread. For instance, it stores the usage information such as whether a hardware thread used one or more of the processing elements, the amount of usage of various resources on the core, the amount of cache usage, etc. The operating system in one embodiment accesses the information, performs analysis based on the information and makes scheduling decisions that would fulfill quality of service guarantees. The register at 614 may store information pertaining to requests from the operating system as to how the processing elements or other resources on the core should be allocated to the running threads. For instance, the operating system may request to reserve one or more functional units for a given thread. Similarly, the operating system may request to restrict one or more functional units for a given thread. Still yet, the operating system may request that a number of cache bytes or partitions be reserved for a given thread. The operating system may request such reservations or restrictions based on the analysis and scheduling decisions that is has made from using the information stored in the utilization register 612.

The operating system may reserve a particular processing element for a given thread or given set of threads, may reserve functional units for a given thread or given set of threads, and may reserve cache lines and sub-levels for data. Similarly, the operating system may restrict a given thread from using a particular processing element, functional unit, or cache sub-level. By reserving the needed resources or otherwise controlling the use of the resources on a given core, the operating system is able to meet the quality of service requirements.

In addition, by using the logged information characterizing a given thread's attributes and resource usage, the operating system is able to make decisions as to which threads should or should not be scheduled together or near each other. For example, the operating system may determine how much each thread makes uses of the different processing elements on the core, evaluate the threads the operating system has to schedule, decide whether scheduling certain threads together would meet the promised quality of service, and schedule the threads accordingly.

In an exemplary embodiment of the present disclosure the characterization and usage information about different threads executing on a given core are obtained and gathered during the real time processing of the hardware threads. In another embodiment, the execution environment may be modeled and simulated to obtain the information. Similarly, the operating system's reserving and restricting may be also modeled and simulated, and the performance results from such simulation may be used, for example, for benchmarking.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of providing quality of service scheduling in multithreaded processing, comprising:
    identifying a plurality of hardware resources utilized by a hardware thread and its corresponding software thread in simultaneous multithreaded processing, the plurality of hardware resources including at least a plurality of floating point units, a decoder, and an L1 cache wherein the hardware thread's usage information is tracked individually for each of the plurality of floating point units, the decoder, and the L1 cache;
    communicating by hardware to an operating system the identified one or more hardware resource utilization; and
    allowing reservation by the operating system of the one or more hardware resources for a software thread in the simultaneous multithreaded processing based on individually tracked usage information of said each of the plurality of floating point units, the decoder, and the L1 cache, wherein communication between the hardware and the operating system is achieved by using a mapping stored in a core that allows the operating system to log a software thread identifier, and the hardware to inserts a corresponding hardware thread identifier when the hardware executes the software thread.

2. The method of claim 1, wherein the step of identifying includes identifying one or more hardware resources utilized by a set of threads in simultaneous multithreaded processing.

3. The method of claim 1, wherein the step of identifying is performed by hardware.

4. The method of claim 1, wherein the step of communicating includes storing information pertaining to the identified one or more hardware resource utilization.

5. The method of claim 1, wherein the one or more hardware resources include one or more processing elements, functional units or cache memory or combination thereof.

6. The method of claim 1, wherein the one or more hardware resources further includes at least an integer unit, an arithmetic logic unit, a shifter, a register, a load-store unit, cache memory or combination thereof.

7. The method of claim 1, further including:
scheduling one or more threads based on information associated with the identified one or more hardware resource utilization.

8. The method of claim 7, wherein the step of scheduling is performed by an operating system.

9. The method of claim 1, further including:
reserving one or more hardware resources for a thread based on information associated with the identified one or more hardware resource utilization.

10. The method of claim 9, wherein the step of reserving is performed by an operating system.

11. The method of claim 9, wherein the step of reserving includes storing one or more data bits in a register accessible by hardware, the data bits identifying which one or more hardware resources to reserve for a thread.

12. The method of claim 1, wherein the step of communicating includes storing in a register accessible by an operating system, one or more data bits that identify one or more hardware resource utilization by a thread.

13. The method of claim 12, wherein the step of storing is performed by hardware.

14. The method of claim 1, further including:
analyzing information associated with the identified one or more hardware resource utilization by a thread.

15. The method of claim 1, further including:
restricting one or more hardware resources from a thread based on information associated with the identified one or more hardware resource utilization.

16. A method of providing quality of service scheduling in multithreaded processing, comprising:
accessing, by an operating system, information associated with hardware resource utilization per hardware thread and its corresponding software thread in simultaneous multithreaded processing, information tracked by hardware associated with hardware resource utilization including the hardware thread's usage information tracked individually for each of a plurality of floating point units, a decoder, and an L1 cache, wherein a counter is kept for each of the floating point units to track usage of said each of the floating point units individually, the information indicating which hardware threads on a core have used which hardware resources on the core; and scheduling by the operating system one or more software threads based on the information, wherein the accessing by the operating system is achieved by using a mapping stored in the core that allows the operating system to log a software thread identifier, and the hardware to insert a corresponding hardware thread identifier responsive to the hardware executing the software thread.

17. The method of claim 16, further including:
analyzing the information to determine at least one of memory utilization pattern, thread affinity concern, thread interference issue, and other thread resource behavior affecting utilization, and the step of scheduling includes scheduling one or more threads based on at least one of memory utilization pattern, thread affinity concern, thread interference issue, and other thread resource utilization affection behavior.

18. A method of providing quality of service scheduling in multithreaded processing, comprising:
accessing, by an operating system, information tracked by hardware associated with a software thread's and its corresponding hardware thread's use of a plurality of hardware resources on a core in simultaneous multithreaded processing, the plurality of hardware resources including at least a plurality of floating point units, a decoder, and an L1 cache wherein the hardware thread's usage information is tracked individually for each of the plurality of floating units, the decoder, and the L1 cache, wherein a counter is kept for each of the floating point units to track usage of said each of the floating point units individually, the information indicating which hardware threads on the core have used which hardware resources on the core; and reserving by the operating system one or more hardware resources for a software thread based on the accessed information, wherein the accessing by the operating system is achieved by using a mapping stored in the core that allows the operating system to log a software thread identifier, and the hardware to insert a corresponding hardware thread identifier responsive to the hardware executing the software thread.

19. A system for providing quality of service scheduling in multithreaded processing, comprising:
a hardware controller on a processor operable to track a hardware thread's and its corresponding software thread's use of a plurality of hardware resources in simultaneous multithreaded processing, the plurality of hardware resources including at least a plurality of floating point units, a decoder, and an L1 cache, wherein the hardware thread's usage information is tracked individually for each of the plurality of floating point units, the decoder, and the L1 cache, the hardware controller further operable to communicate information associated with the use of one or more hardware resources per hardware thread to an operating system;

the operating system operable to access the information and schedule one or more software threads based on individually tracked usage information of said each of the plurality of floating point units, the decoder, and the L1 cache, wherein communication between the hardware controller and the operating system is achieved by using a mapping stored in a core that allows the operating system to log a software thread identifier, and the hardware controller to insert a corresponding hardware thread identifier responsive to the hardware controller executing the software thread.

* * * * *